Oct. 10, 1961    H. J. WOOLSLAYER ET AL    3,003,787
SEMI-TRAILER WITH SUPPORTING JACK
Filed Feb. 13, 1961    2 Sheets-Sheet 1

INVENTORS
HOMER J. WOOLSLAYER
CECIL JENKINS
ERWIN A. CAMPBELL
BY
ATTORNEYS

INVENTORS
HOMER J. WOOLSLAYER
CECIL JENKINS
BY ERWIN A. CAMPBELL

ATTORNEYS

United States Patent Office 3,003,787
Patented Oct. 10, 1961

3,003,787
SEMI-TRAILER WITH SUPPORTING JACK
Homer J. Woolslayer and Cecil Jenkins, Tulsa, Okla., and Erwin A. Campbell, Wexford, Pa., assignors to Lee C. Moore, Pittsburgh, Pa., a corporation of Pennsylvania
Filed Feb. 13, 1961, Ser. No. 88,722
8 Claims. (Cl. 280—150.5)

This invention relates to semi-trailers, and more particularly to jacks permanently carried by the front portions of trailers to support them when disconnected from the trucks that haul them.

When a semi-trailer is disconnected from the vehicle that hauls it, means must be provided for supporting the front end of the trailer. A common way of doing this is by normally elevated small wheels that are let down from the trailer chassis. However, such an arrangement is not suitable for supporting trailers carrying extremely heavy loads, especially trailers on which oil field drilling equipment is permanently mounted. In such cases the trailer must be held as steady as possible as the machinery on it is operated.

It is among the objects of this invention to provide a semi-trailer with a built-in jack, which is sturdy enough to safely support heavy trailer loads, which helps hold the trailer in fixed position in spite of vibrating machinery mounted on it, which will not sink into the ground, and which can be operated from a winch.

In accordance with this invention the bed of a semi-trailer is provided in opposite sides with vertical openings, through each of which a post extends loosely. Sleeves, which slidably receive the posts, are pivotally connected with the bed on parallel axes to permit the lower ends of the posts to be swung toward and away from each other. Bearing pads are pivotally connected to the lower ends of the posts beneath the trailer bed on parallel axes. Secured to the pads are arms that extend inwardly toward each other. Each arm is pivotally supported beneath the bed on an axis extending lengthwise of the bed. The pads normally are held above the ground by resilient means. Sheaves are supported by the bed and the upper ends of the posts. To operate the jack a line is reeved around the sheaves, with one end anchored and the other end adapted to be connected to a winch. The sheaves and line are arranged to move the posts downward in the sleeves in order to swing the pads down against the ground so that the line then can move the trailer bed up the posts to a higher level.

The preferred embodiment of the invention is illustrated in the accompanying drawings, in which.

Figure 1:
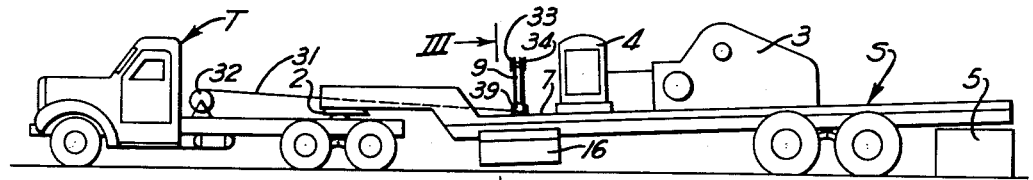
FIG. 1 is a side view of a semi-trailer about to be disconnected from a truck.
Figure 2:
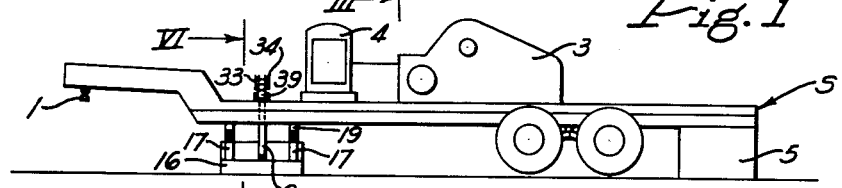
FIG. 2 is a side view of the trailer separated from the truck and supported in stable position.

Referring to FIGS. 1 and 2 of the drawings, a semi-trailer S is connected at its front end by a king pin 1 and a fifth wheel 2 to the back of a tractor or truck T that also supports the front end of the trailer. The trailer is shown carrying the drawworks 3 and engine 4 of oil well drilling apparatus, although other loads could, of course, be carried just as well. The rear end of the trailer has been backed over a suitable supporting structure 5 that will be engaged by the area of the trailer above it when the front end of the trailer is disconnected from the truck and raised to level the trailer. The supporting structure covers a large enough area of the ground to avoid sinking into it, and is high enough to permit the trailer wheels to be raised from the ground, or at least to be relieved of most of their load, when the trailer is leveled. The raising of the front end of the trailer to support it independently of the truck and to level the trailer is accomplished by a jack that forms the subject matter of this invention and that will now be described.

The jack is located near the rear end of the gooseneck of the trailer, for which purpose the front portion of the trailer bed 7 is provided with a pair of laterally spaced openings 8 (FIGS. 3, 6 and 7) that are large enough to each loosely receive a post 9 extending through the bed. Each post is slidably mounted in a sleeve 10 that is pivotally connected with the bed on an axis extending lengthwise of it. Preferably, the lower portion of each sleeve is provided with trunnions 11 supported by a bracket 12 mounted on the trailer bed astraddle of an opening 8 and extending inwardly therefrom. It will be seen that the lower ends of the posts therefore can be swung toward and away from each other. The upper part of each sleeve is provided with a pair of aligned radial holes that contain a removable pin 13 extending through registering radial holes 14 (FIG. 6) in the post when the latter is in its upper position. The pins positively support the two posts while the trailer is traveling and are a safety feature.

Figure 3:
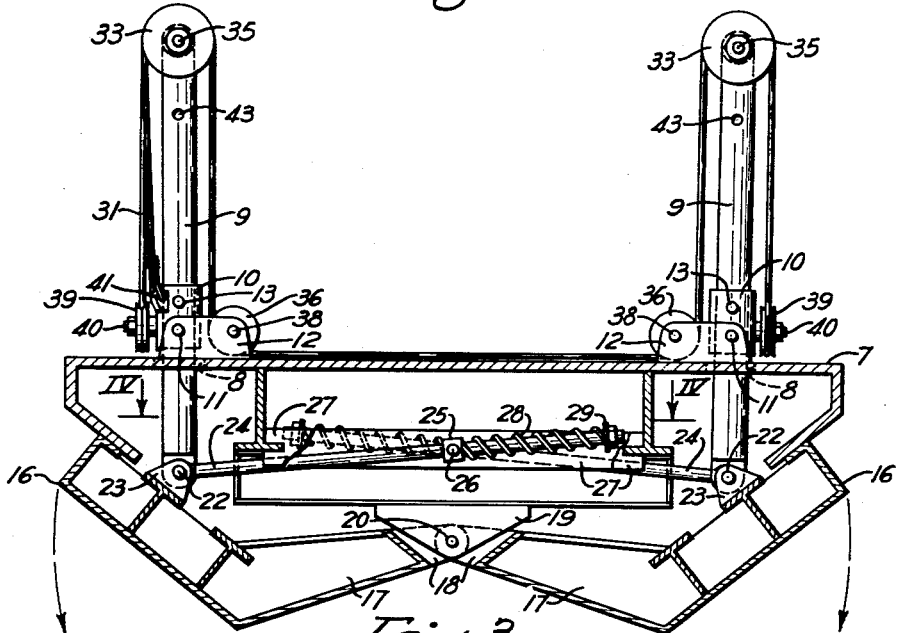
FIG. 3 is an enlarged cross section of the trailer taken on the line III—III of FIG. 1.
Figure 5:
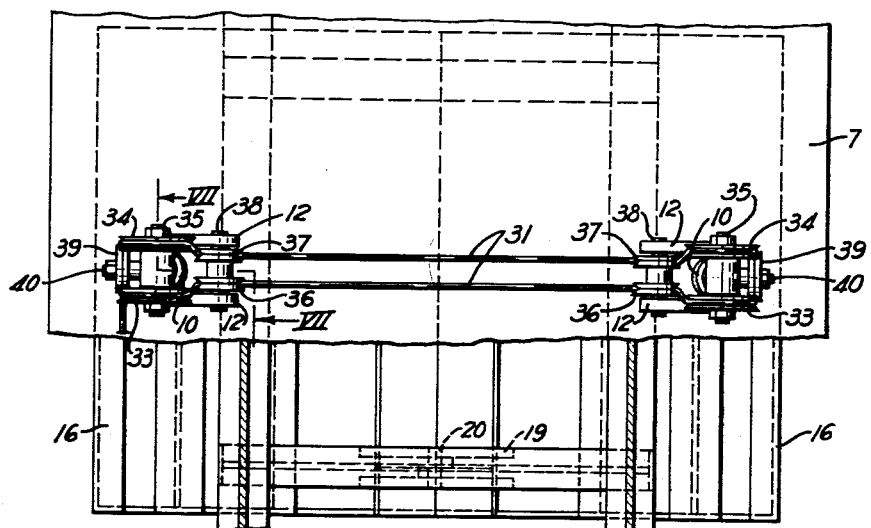
FIG. 5 is an enlarged fragmentary plan view of the trailer, partly broken away, shown in FIG. 2.

Below each post there is a bearing pad 16 that extends lengthwise of the trailer for a few feet. The bottom areas of the pads are great enough to form a firm foundation for the trailer when they are in use. Secured to the inner sides of the two pads are arms 17 that extend inwardly toward each other as shown in FIGS. 3 and 5. The inner ends of the arms may be provided with longitudinally spaced lugs 18 that are pivotally mounted in brackets 19 secured to the bottom of the trailer frame. For greatest stability, the brackets are located at the center of the frame and all of the arms are pivoted on the same axis 20 extending lengthwise of the trailer.

Figure 4:
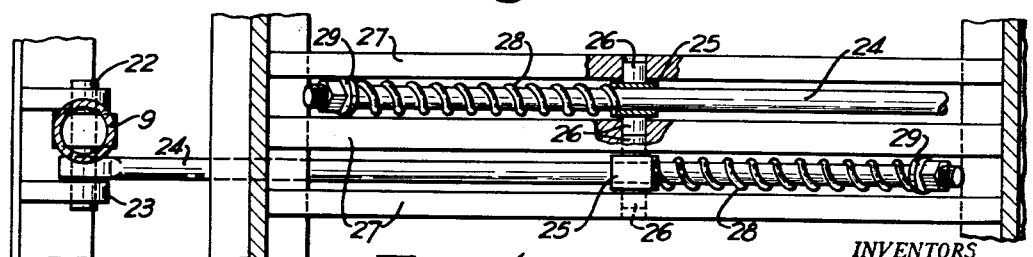
FIG. 4 is a further enlarged fragmentary horizontal view taken on the line IV—IV of FIG. 3.
Figure 6:
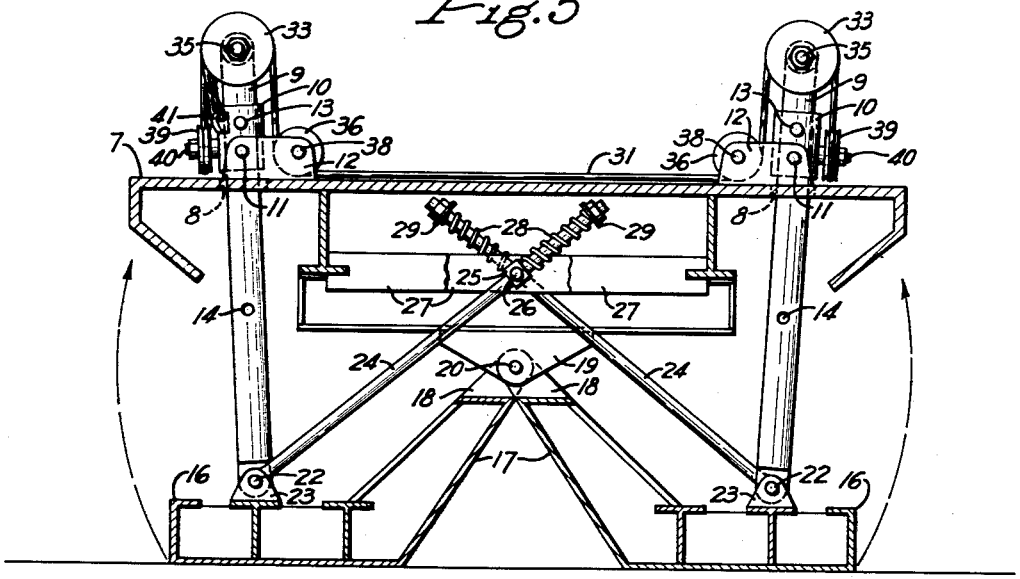
FIG. 6 is an enlarged cross section of the trailer taken on the line VI—VI of FIG. 2.
Figure 7:
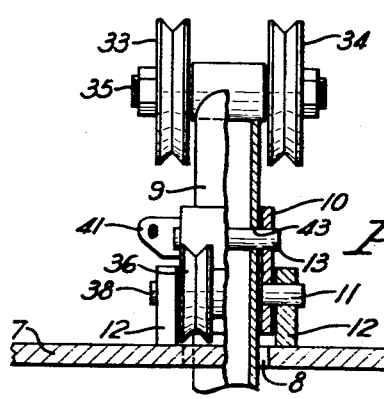
FIG. 7 is a further enlarged fragmentary vertical section taken on the line VII—VII of FIG. 5.

The lower ends of posts 9 are pivotally mounted on parallel pivot pins 22 that extend through brackets 23 mounted on the pads about midway between their ends, so that the posts and pads must move together. Also pivotally connected to the pads, preferably in the same brackets 23 as the posts, are the outer ends of a pair of bars 24 that extend inwardly past each other as shown in FIGS. 3, 4 and 6. Each bar is slidably mounted in a collar 25 that has front and rear trunnions 26 journaled in cross bars 27 of the trailer frame. It is preferred that both collars be pivoted on the same axis extending lengthwise of the trailer. Coil springs 28 on the bars are compressed between the collars and washers 29 mounted on the inner ends of the bars. The springs urge the inner ends of the bars away from the collars and are strong enough to lift pads 16 and hold them up against the bottom of the trailer bed, as shown in FIGS. 1 and 3, when the trailer is attached to a truck. Of course, when the pads are up, posts 9 also extend their maximum distance above the trailer bed.

When the trailer reaches a position such as shown in FIG. 1 and it is desired to disconnect it from the truck, safety pins 13 are removed from sleeves 10 and posts 9 and then pads 16 are lowered against the resistance of coil springs 28. This is accomplished by moving the posts down through the trailer bed and that is done by means of a wire line 31 reeved around a set of sheaves and connected to a suitable winch, such as the usual truck winch 32. To receive the line, a pair of sheaves 33 and 34 are journaled on the opposite ends of a shaft 35 mounted on the upper end of each post. The two shafts are substantially parallel. Another pair of sheaves 36 and 37 are journaled on a shaft 38 mounted in the inner end of each bracket 12. These shafts likewise are parallel. At the outer end of each bracket there is a single sheave 39 journaled on an axis extending transversely of the trailer. Although sheaves 39 may be supported directly from the trailer bed, it is preferred to support them from sleeves 10 by means of outwardly projecting stub shafts 40.

Near one of the single sheaves 39 there is an anchor lug 41 secured to the same sleeve. One end of line 31 is anchored to the lug, from which the line extends up over the front post sheave 33 above it and then down around the underlying front bracket sheave 36. From there the line extends across the trailer and up around the front sheave in the other bracket to post sheave 33 and then down around the underlying sheave 39. The line then extends back up over the other post sheave 34 and down around the underlying rear bracket sheave 37, across the trailer bed to the other bracket sheave 37 and then up over the last post sheave 34. The line then extends down around the remaining sheave 39 and forward to the winch.

When the line is reeled in by the winch, it forces the two posts 9 downward and they therefore push the pads 16 down until they rest firmly on the ground. Continued operation of the winch, after the pads and posts can move downward no further, will cause the line to lift the bracket sheaves 36 and 37 and thereby elevate the trailer bed on the posts. By the time the holes through the upper ends of the sleeves are aligned with transverse holes 43 (FIGS. 3 and 7) in the upper portions of the post, the trailer bed will be substantially level. Locking pins 13 then are inserted in the aligned holes to support the front end of the trailer in its elevated position so that the line can be disconnected from the winch to allow the truck to move away. As shown in FIGS. 2 and 6, the rear end of the trailer will be firmly supported by supporting structure 5, and its front end portion will be held stable by the two pads 16 set firmly on the ground.

In order to move the trailer to another location, the truck is backed under the trailer gooseneck and line 31 is reconnected to the truck winch. By putting tension on the line, pins 13 can be removed and then the line can be allowed to unreel slowly from the winch so that king pin 1 will descend into the fifth wheel 2. With the weight of the front end of the trailer now taken by the trunk, the winch can quickly slacken the line so that springs 28 can cause bars 24 to swing pads 16 up from the ground and simultaneously move the posts up through sleeves 10 to their original position shown in FIGS. 1 and 3.

The jack just described is a permanent part of the semi-trailer, always ready for use. It is operated in one direction by a winch and in the opposite direction by springs. Such operation is much easier and faster than a manual operation of a screw jack. When in operative position, the jack helps greatly to stabilize the trailer.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A truck semi-trailer comprising a trailer bed provided near opposite sides with vertical openings, a post extending loosely through each opening, a sleeve slidably receiving each post, means pivotally connecting the sleeves with the bed on parallel axes to permit the lower ends of the posts to be swung toward and away from each other, bearing pads pivotally connected to the lower ends of the posts beneath said bed on parallel axes, arms secured to the pads and extending inwardly toward each other, means beneath said bed pivotally supporting the inner end of each arm on an axis extending lengthwise of said bed, resilient means normally holding said pads above the ground with the posts in an elevated position relative to the bed, and means for moving said posts downward in the sleeves to swing said pads down against the ground and for then moving the bed up the posts to a higher level.

2. A semi-trailer according to claim 1, in which said sleeves are provided with transverse holes therethrough and each of said posts has a pair of vertically spaced transverse holes through it selectively alignable with said holes in the surrounding sleeve, and locking pins are provided for insertion in said sleeve holes and the post holes aligned therewith for locking the posts in either raised or lowered position relative to the trailer bed.

3. A semi-trailer according to claim 1, in which the inner ends of said arms are pivotally supported on the same axis.

4. A truck semi-trailer comprising a trailer bed provided near opposite sides with vertical openings, a post extending loosely through each opening, a sleeve slidably receiving each post, means pivotally connecting the sleeves with the bed on parallel axes to permit the lower ends of the posts to be swung toward and away from each other, bearing pads pivotally connected to the lower ends of the posts beneath said bed on parallel axes, arms secured to the pads and extending inwardly toward each other, means beneath said bed pivotally supporting the inner end of each arm on an axis extending lengthwise of said bed, resilient means normally holding said pads above the ground with the posts in an elevated position relative to the bed, sheaves supported by the bed and the upper ends of the posts, and a line reeved around said sheaves with one end anchored and the other end adapted to be connected to a winch, the sheaves and line being arranged to move said posts downward in the sleeves to swing said pads down against the ground so that the line then can move the bed up the posts to a higher level.

5. A semi-trailer according to claim 4, including brackets mounted on said bed pivotally supporting said sleeves and extending inwardly toward each other, and some of said bed-supported sheaves being journaled in the inner ends of the brackets.

6. A semi-trailer according to claim 4, including brackets mounted on said bed pivotally supporting said sleeves and extending inwardly toward each other, one of said bed-supported sheaves being pivotally connected to the outer side of each sleeve, and two of said bed-supported sheaves being journaled in the inner end of each bracket on an axis extending lengthwise of the bed, there being two sheaves supported by the upper ends of each post.

7. A truck semi-trailer comprising a trailer bed provided near opposite sides with vertical openings, a post extending loosely through each opening, a sleeve slidably receiving each post, means pivotally connecting the sleeves with the bed on parallel axes to permit the lower ends of the posts to be swung toward and away from each other, bearing pads pivotally connected to the lower ends of the posts beneath said bed on parallel axes, arms secured to the pads and extending inwardly toward each other, means beneath said bed pivotally supporting the inner end of each arm on an axis extending lengthwise of said bed, bars beneath the bed having outer ends pivotally connected to said pads on parallel axes, means beneath the bed slidably receiving said bars and pivotally supporting each one on an axis extending lengthwise of said bed, coil springs on the inner end portions of the bars and compressed between their supporting means and their inner ends to normally hold the posts in an elevated position relative to the bed with said pads spaced from the ground, and means for moving said posts downward in the sleeves to swing said pads down against the ground and for then moving the bed up the posts to a higher level.

8. A truck semi-trailer comprising a trailer bed provided near opposite sides with vertical openings, a post extending loosely through each opening, a sleeve slidably receiving each post, means pivotally connecting the sleeves with the bed on parallel axes to permit the lower ends of the posts to be swung toward and away from each other, bearing pads pivotally connected to the lower ends of the posts beneath said bed on parallel axes, arms secured to the pads and extending inwardly toward each other, means beneath said bed pivotally supporting the inner end of each arm on an axis extending lengthwise of said bed, bars beneath the bed having outer ends pivotally connected to said pads on parallel axes, a collar slidably receiving each bar, means beneath the bed pivotally supporting each collar on an axis extending lengthwise of the bed, coil springs encircling the bars between their inner ends and said collars, means mounted on the inner ends of the bars compressing the springs against the collars to normally hold the posts in an elevated position relative to the bed with said pads spaced from the ground, and means for moving said posts downward in the sleeves to swing said pads down against the ground and for then moving the bed up the posts to a higher level.

References Cited in the file of this patent

UNITED STATES PATENTS

| | | |
|---|---|---|
| 1,448,054 | Clement | Mar. 13, 1923 |
| 2,190,252 | Brant et al. | Feb. 13, 1940 |
| 2,452,632 | Cameron | Nov. 2, 1948 |
| 2,526,905 | Sartin | Oct. 24, 1950 |
| 2,741,373 | Edgar | Apr. 10, 1956 |